United States Patent [19]

Benson et al.

[11] Patent Number: 5,202,150

[45] Date of Patent: Apr. 13, 1993

[54] MICROWAVE IMPREGNATION OF POROUS MATERIALS WITH THERMAL ENERGY STORAGE MATERIALS

[75] Inventors: David K. Benson, Golden; Richard W. Burrows, Conifer, both of Colo.

[73] Assignee: The United States of America as represented by the United States Department of Energy, Washington, D.C.

[21] Appl. No.: 874,141

[22] Filed: Apr. 27, 1992

Related U.S. Application Data

[63] Continuation-in-part of Ser. No. 668,522, Mar. 13, 1991.

[51] Int. Cl.⁵ .............................................. B05D 3/02
[52] U.S. Cl. .................................. 427/595; 427/376.2; 427/380; 427/382; 427/385.5; 427/389.9; 427/393.6; 427/397; 427/407.1; 427/408; 427/416; 427/419.2
[58] Field of Search ............... 427/45.1, 376.2, 380, 427/382, 385.5, 389.9, 393.6, 397, 407.1, 408, 416, 419.2

[56] References Cited

U.S. PATENT DOCUMENTS 4,572,864  2/1986  Benson et al. ................ 428/305.5

OTHER PUBLICATIONS

Benson et al., "New Phase-Change Thermal Energy Storage Materials for Buildings" III International Conference on Energy Storage for Building Heating & Cooling 1985.

*Primary Examiner*—Bernard Pianalto
*Attorney, Agent, or Firm*—Ken Richardson; John M. Albrecht; William R. Moser

[57] ABSTRACT

A method for impregnating a porous, non-metallic construction material with a solid phase-change material is described. The phase-change material in finely divided form is spread onto the surface of the porous material, after which the porous material is exposed to microwave energy for a time sufficient to melt the phase-change material. The melted material is spontaneously absorbed into the pores of the porous material. A sealing chemical may also be included with the phase-change material (or applied subsequent to the phase-change material) to seal the surface of the porous material. Fire retardant chemicals may also be included with the phase-change materials. The treated construction materials are better able to absorb thermal energy and exhibit increased heat storage capacity.

27 Claims, 2 Drawing Sheets

MICROWAVE IMPREGNATION OF POROUS MATERIALS WITH THERMAL ENERGY STORAGE MATERIALS

CONTRACTUAL ORIGIN OF THE INVENTION

The United States Government has rights in this invention under Contract No. DE-AC02-83CH10093 between the United States Department of Energy and the Solar Energy Research Institute, a Division of the Midwest Research Institute.

CROSS-REFERENCE TO RELATED APPLICATION

This application is a continuation-in-part of our copending application Ser. No. 07/668,522, filed Mar. 13, 1991,

BACKGROUND OF THE INVENTION

1. Field of the Invention

The present invention relates generally to incorporation of thermal energy storage materials into porous materials. More particularly, this invention relates to incorporation of solid phase-change materials into porous materials such as gypsum wallboard and cellulosic materials such as ceiling tiles and wood. Even more particularly, this invention relates to improved methods and techniques for incorporating phase-change materials and other chemicals into porous construction materials.

2. Description of the Prior Art

Energy is commonly stored in heated bricks, rock beds, concrete, water tanks, and the like. Such thermal energy storage methods require leakproof containers and/or extensive space and mechanical support for the massive amounts of storage materials. In such materials, the amount of energy stored is proportional to the temperature rise and to the mass of the storage material, and is generally limited to about 1 calorie per gram per degree Celsius (1 BTU per pound per degree Fahrenheit).

In contrast, phase-change materials store much larger amounts of thermal energy over a small temperature change by virtue of reversible physical/chemical/structural changes such as melting. For example, certain hydrated inorganic salts used for thermal energy storage absorb as much as 96 BTU per pound at the melting temperature.

There are disadvantages to the use of solid/liquid phase-change materials. They must be reliably maintained in a durable container and their melting-crystallization change must be fully reversible. In the past, many solid/liquid phase-change materials have leaked and/or have lost storage capacity because of irreversible changes over periods of time. In addition, the conduction of heat into and out of solid/liquid phase-change materials is commonly limited by the poor thermal properties of the liquid phase of the material and/or its interface with the container used to hold the phase-change material.

A series of organic polyols which are related compounds with tetrahedral molecular structures has been known to be suitable for thermal energy storage. These polyols include pentaerythritol ($C_5H_{12}O_4$), pentaglycerine ($C_5H_{12}O_3$), neopentyl glycol ($C_5H_{12}O_2$), neopentyl alcohol ($C_5H_{12}O$) and neopentane ($C_5H_{12}$). Certain of these polyols can be alloyed together to provide reversible solid-solid mesocrystalline phase transformations of high enthalpy and adjustable temperatures of transition.

These polyols are referred to as phase-change materials (PCMs), which reversibly absorb large amounts of thermal energy during solid-state transformations at temperatures well below their melting temperatures. These transformation temperatures may be adjusted over a wide range by selecting various compositions of solid-solution mixtures of the polyols.

A large number of phase-change materials were evaluated by NASA in the 1960's as "thermal capacitors" to passively buffer the temperature swings experienced by earth orbiting satellites. See Hale et al., Phase Change Materials Handbook, NASA Report B72-10464 (Aug. 1972). Among the hundreds of phase-change materials evaluated by NASA were a few materials which exhibited solid-to-solid transformations with large enthalpies. Though these materials were not used for space applications, a decade later they became of interest to scientists searching for better phase-change materials for thermal energy storage. Solid-state phase-change materials have the advantages of less stringent container requirements and greater design flexibility.

In general, the thermal conductivity of a phase-change thermal storage material is an important parameter, as well as its transition temperature. To a certain extent, the thermal conductivity of phase-change materials is adjustable by introducing additives to form composite materials. For example, the heat transport in paraffin phase-change materials can be adjusted by introducing metal matrices, such as aluminum honeycomb or expanded aluminum mesh into the phase-change material container. See: deJong, A.G., Improvement of Heat Transport in Paraffins for Latent Heat Storage Systems, in Thermal Storage of Solar Energy (C. den Ouden, ed.) pp. 123–1344 (1981); and Benson et al., Solid State Phase Change Materials for Thermal Energy Storage in Passive Solar Heated Buildings, Proceedings of the Tenth Energy Technology Conference, Washington, D.C., pp. 712–720, (Feb. 28–Mar. 2, 1983). Other literature discusses a class of hydrocarbon compounds for use in thermal energy storage components for passive solar heated buildings, with particular reference to polyhydric alcohols such as pentaerythritol, trimethylol ethane, neopentyl glycol, and closely related materials. This work also discusses solid-state phase-change materials which provide compact thermal energy storage with reduced concern for the containment of the phase-change material. Another work, Christensen, Advanced Phase Change Storage for Passive Solar Heating: Analysis of Materials and Configurations, in Proceedings of the ASES Passive 83 Conference, Glorieta, N.Mex., (Sep. 7-9, 1983) discusses the performance of phase-change materials for thermal storage in passive solar heating systems, including factors other than material properties that affect storage performance and optimization.

A related work, Benson et al. Materials Research for Passive Systems-Solid State Phase Change Materials and Polymer Photodegradation, in Proceedings of the Passive and Hybrid Solar Energy Update, Washington, D.C., pp. 228–235, (Sept. 15–17, 1982), discusses solid-state phase-change materials being evaluated for use in passive solar thermal energy storage systems, with particular emphasis on pentaerythritol, pentaglycerine and neopentyl glycol. Another work, Benson, Organic Polyols: Solid State Phase Change Materials for Thermal Energy Storage, in Opportunities in Thermal Storage R and D, EPRI Special Report EM-3159-SR, pp. 19-1 to 19-10 (July 1983); discusses a homologous series of organic polyols based on pentaerythritol, including pentaglycerine and neopentyl glycol, demonstrating potential for thermal energy storage at temperatures from below 25° C. to 188° C.

In U.S. Pat. No. 4,572,864, incorporated herein by reference, there are described certain techniques for increasing the thermal storage capacity of various solid materials. The techniques involved placement of certain polyhydric alcohols into or in contact with solid materials such as metals, carbon, plastic, cellulose material, fibrous material, concrete, porous rock, gypsum, siliceous materials, etc. The techniques described in such patent include melting the phase-change alcohols and then adding the solid materials thereto or dipping the solid material into the molten phase-change material, dissolving the phase-change alcohols and impregnating solid porous materials with the solution and then drying, and pouring molten phase-change material into cavities in solid materials.

The practice of working with vats of molten phase-change compounds or materials presents safety hazards and pollution problems. The molten phase-change materials have high vapor pressures and are flammable. Also, the escape of the vapors and their condensation in the air and onto any unheated surfaces can produce potential inhalation and dust explosion problems in the plant.

Of course, much time and energy is required to heat a vat of phase-change material above its melting point and hold it there for the duration of a work day. Another disadvantage of the use of a vat of molten phase-change material is that separate vats are required for each different composition of phase-change material to be used on various porous materials.

Although addition of particles or pellets of solid (unmelted) phase-change material into the mix of raw ingredients used to make construction materials has been tried, this technique is very restrictive. The phase-change material can easily interfere with the processing of the construction material. Polyalcohols, for example, are water soluble and interfere with the hydration (setting) of concrete or gypsum. Certain other phase-change materials are also water soluble and would be expected to interfere with the processing of these construction materials. Some construction materials, such as wood products, are not readily adapted to the incorporation of particles or pellets of an additive.

The previous techniques require a dedicated production process. As a result, it is difficult or cumbersome to make changes to the process or to tailor the properties of the final impregnated material.

There has not heretofore been provided an efficient and safe technique for impregnating phase-change materials into porous materials (such as construction materials) having the advantages of the techniques of the present invention.

SUMMARY OF THE INVENTION

It is an object of this invention to incorporate thermal energy storage materials into porous materials, including construction materials.

It is another object of this invention to increase the heat storage capacity of construction materials by means of a novel process.

It is another object of this invention to incorporate thermal energy storage materials into construction materials quickly and efficiently to provide composite materials for thermal energy storage.

It is another object of this invention to incorporate thermal energy storage materials into construction materials at low temperature.

It is another object of this invention to incorporate thermal energy storage materials into construction materials in a uniform manner.

It is yet another object of this invention to incorporate a mixture of chemicals into construction materials.

It is another object of this invention to incorporate fire-retardant chemicals and sealing chemicals into construction materials.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

To achieve the foregoing and other objects and in accordance with the purpose of the present invention, as embodied and broadly described herein, the method of this invention may comprise impregnating a porous, non-metallic material (such as construction material) with a solid phase-change material by:

(a) providing a phase-change material having a melting point above room temperature; wherein the phase-change material absorbs microwave energy to an extent sufficient to cause melting thereof;

(b) applying the phase-change material to the surface of the porous material; and (c) exposing the porous material and phase-change material to microwave energy in a manner such that the phase-change material melts and is absorbed into the porous material.

The method of this invention is rapid and efficient. Heating of the porous construction material is minimized because the microwave energy is almost totally absorbed by the phase-change material. To the extent that the porous material does become heated by the microwave energy, deeper penetration of the phase-change material into the porous material is achieved.

Various types of materials may be treated in accordance with the techniques of this invention, including, for example, siliceous materials (e.g., concrete), gypsum, porous rock, plastics, cellulosic materials, glass fibers, natural fibers, artificial fibers, and mixtures thereof. Examples of suitable types of common construction materials which may be treated in accordance with this invention include gypsum wallboard, cellulosic ceiling tiles, wood, etc. The resulting impregnated materials have enhanced thermal storage properties. Useful porous materials have a porosity of at least 10% and, more preferably, at least 30%.

The types of useful phase-change materials which are suitable for use in this invention include solid materials having a melting point above room temperature, and a viscosity preferably less than about 100 cps at or near their melting point (and even more preferably less than about 20 cps).

Preferably the phase-change materials are absorptive of microwave energy. If desired or necessary, however, there may be included with the phase-change material an amount of a material which is highly absorptive of microwave energy. For example, it is possible to include a small amount of carbon particles or other such materials (e.g., tin oxide) in with the phase-change material in order to increase the absorption of microwave energy.

Preferred solid-state phase-change materials used in this invention include polyhydric alcohols, such as pentaerythritol, trimethylol ethane (also known as pentaglycerine), neopentyl glycol and related compounds including trimethylol propane, monoaminopentaerythritol, diamino-pentaerythritol and tris(hydroxymethyl)acetic acid, separately or in combinations, which provide reversible heat storage through crystalline phase transformations. These phase change materials do not become liquid during use and are in contact with the solid porous material. The resulting composite material has enhanced thermal storage characteristics. For example, wallboard or ceiling tiles which have been impregnated with solid phase-change materials are able to absorb heat in a room or building in a manner such that the need for use of air conditioning equipment is greatly reduced. Also, the composite material is able to release thermal energy over a period of time.

Other types of materials may also be included. For example, materials can be included which help to seal the phase-change materials in the porous material. Preferably the sealing chemical is applied to the porous material after the phase-change material has been applied so that the sealing material is able to act as a barrier layer to prevent the phase-change material from emitting any vapors from the porous material. Also, the sealing chemical prevents or restricts water or other liquids from entering into the porous material. Thus, the sealing chemical forms a protective barrier at the surface of the porous material.

Other types of chemicals may also be impregnated in the porous material. For example, fire-retardant chemicals may be included for the purpose of imparting fire resistance properties to the porous material. Also, graphite powder, carbon, or tin oxide may be added to increase microwave absorption properties. Also, particles or materials may be included for the purpose of increasing thermal conducting properties of the chemicals impregnated in the porous material. Further, various pigments or colorants may be included, and other materials which are beneficial for decorative purposes may be included, if desired. It may also be possible to include an adhesive material to facilitate attachment of coverings to the surface of the porous material.

The use of microwave energy results in rapid heating of the chemicals. This reduces fire hazards and cleanup costs and it also reduces the loss of chemical due to evaporation. The use of chemical solvents is also avoided. This reduces pollution and simplifies production processes.

The methods and techniques of this invention also enable different amounts of phase-change material to be impregnated into different areas of porous materials, if desired. By adjusting the power and time settings of the microwave unit, it is possible to adjust the depth of penetration of the melted chemicals into the construction material.

Because heating is essentially limited to the phase-change materials, sealing chemicals, fire-retardant chemicals, etc., vaporization of the chemicals is minimized. The decreased vaporization improves the safety and reduces maintenance problems with the process equipment. Large sheets or pieces of porous material can be impregnated without the need for large containers of molten chemicals. Mixtures of chemicals which are not compatible can still be used as a powder mix and absorbed quickly into the porous material with microwave heating.

BRIEF DESCRIPTION OF THE DRAWINGS

The accompanying drawing, which is incorporated in and forms a part of the specification illustrates a preferred manner of exposing substrates to microwave energy in accordance with the present invention, and together with the description, serves to explain the principles of the invention.

DETAILED DESCRIPTION OF THE PREFERRED EMBODIMENTS

Figure 1:
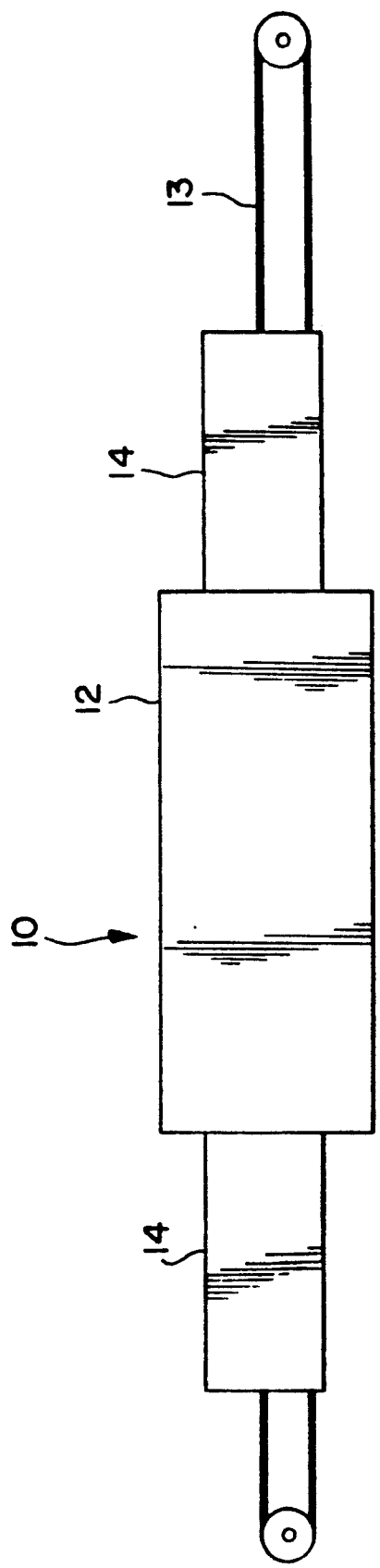
FIG. 1 is a schematic drawing illustrating a high power microwave processor to melt chemicals to impregnate porous material.

In accordance with the present invention a variety of composite materials can be prepared quickly and efficiently. The preferred types of non-metallic porous materials which may be treated in accordance with this invention include gypsum (e.g., in the form of wallboard), siliceous materials (e.g., glass wool), concrete (e.g., in the form of concrete blocks), porous rock, plastic materials, natural fibers (e.g., cotton, wool, jute), artificial fibers (e.g., glass fibers), and mixtures of various materials. The materials have porosity of at least 10%, and preferably of at least 30% or even more.

The porous material must not decompose or melt upon brief exposure to the melted phase-change material. Accordingly, many thermoplastic materials such as polypropylene, polyethylene, etc. would not be suitable. Other synthetic porous materials may be impregnated in accordance with the present invention so long as they have melting points or softening temperatures above the melting point of the phase-change material.

The porous material must not be too electrically conductive or else the microwave energy absorbed and reflected by the porous material will complicate the microwave processing. Preferably the porous material is an electrical insulator (i.e., not electrically conductive) with no strong absorption of microwave energy at 915 or 2450 MHz.

The preferred phase-change materials for use in this invention include polyhydric alcohols, such as pentaerythritol, trimethylol ethane (also known as pentaglycerine), neopentyl glycol and related compounds including trimethylol ethane and propane, monoaminopentaerythritol, diamino-pentaerythritol tris(hydroxymethyl)acetic acid, 2-amino-2-methyl-1,3-propanediol, and pentaerythritol fluoride, separately or in combinations to provide reversible heat storage by solid-state, crystalline phase transformations.

Temperatures of the crystalline phase transformation can be adjusted over the range of from about 7° to 200° C. (45° to 392° F.), by selecting certain of the above mentioned phase-change materials, alone or in suitable mixtures, depending upon the specific phase transformation temperature desired.

The microwave absorption characteristics of phase-change materials useful in this invention have not previously been published. Furthermore, it was not possible to predict that the phase-change materials described herein would absorb microwave energy sufficiently to enable them to be quickly and efficiently heated up to, and above, their melting points.

The most widely-used microwave band is the 2450 MHz band for food processing in so-called microwave ovens. The microwave power is converted to heat when a material absorbs the electromagnetic energy through interactions between the electromagnetic waves and its constituent molecules (or with free electrons in electrical conductors). The best frequency for heating a material depends upon its chemical and physical composition in a complicated fashion and in the case of electrical non-conductors is not readily predictable by theory. Consequently, empirical methods are used to determine the efficiency with which microwave energy of a particular frequency is absorbed by a material. Once the absorption characteristic of a material is determined experimentally, then a simple physical relationship describing the power absorbed in terms of the frequency, electric field amplitude and the material properties can be used:

$$P = \omega \epsilon_r \epsilon_o \tan\delta (E_i)^2$$

where P is the power absorbed and converted to heat, $\omega$ is the frequency of the microwave, $\epsilon_r$ is the real part of the material's complex dielectric constant, $\epsilon_o$ is the permittivity of free space ($8.86 \times 10^{-12}$ Farad/m), $\tan \delta$ is the experimentally determined loss tangent for the particular material and frequency, and $E_i$ is the microwave electric field strength.

As is well known, materials such as glass, ceramic and plastic are not readily heated in microwave ovens. Materials containing water (e.g., food items) are commonly heated in microwave ovens because water is very efficient in absorbing microwave energy.

Figure 2:
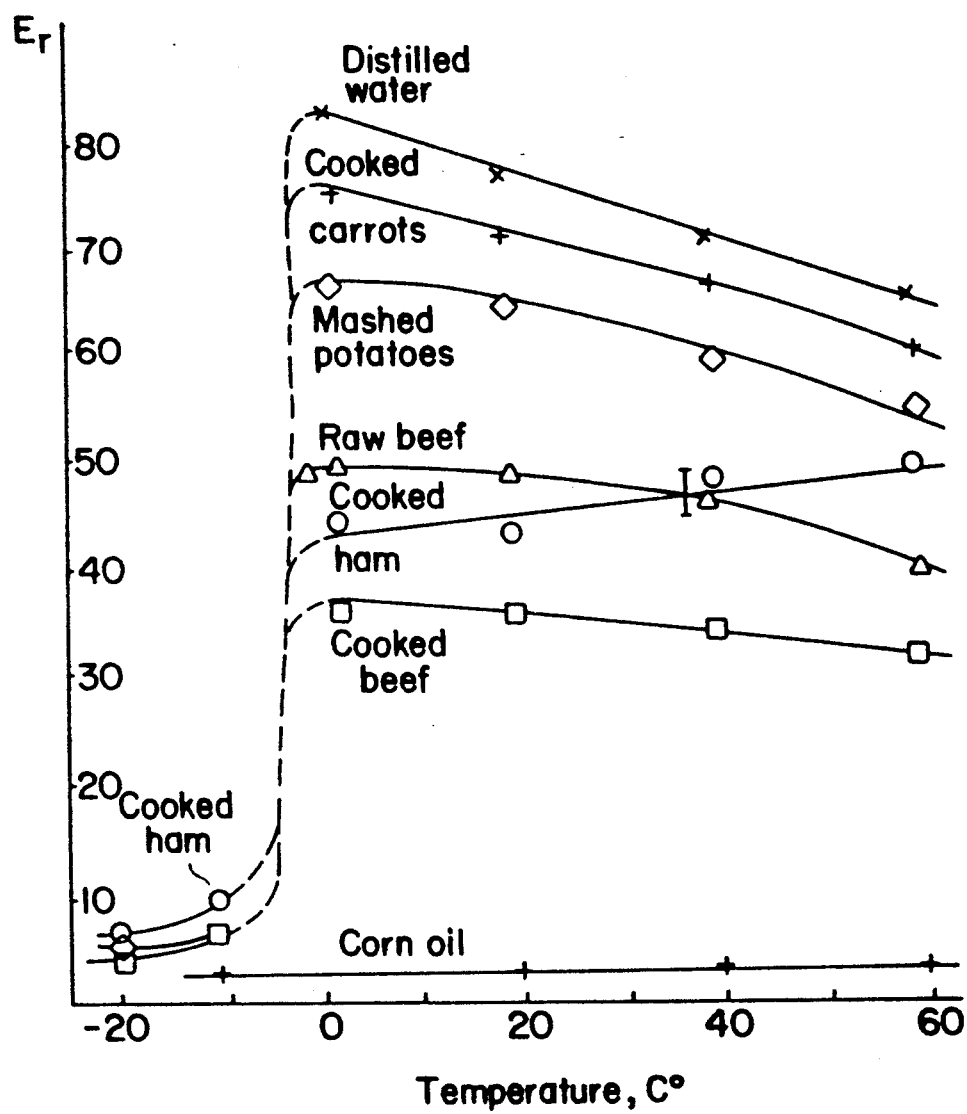
FIG. 2 is a graph showing the real part of the dielectric constant of a number of foods.

A large body of empirical data exist for the 2450 MHz frequency because of this frequency's use in microwave ovens. FIG. 2 shows a graph of the real part of the dielectric constant of a number of foods. Note that water has the highest dielectric constant at this frequency. This is exactly why the 2450 MHz frequency is selected for cooking applications. Table 1 on the other hand shows a listing of other common materials as well as water and clearly shows that these other materials (with the exception of the water containing foods) have much lower capability to absorb this microwave energy (note that the product of the dielectric constant with the loss tangent is proportional to the amount of microwave energy absorbed as shown in the above equation).

TABLE 1

Some Dielectric Properties of Materials 2450 MHz

| | $\epsilon_r$ | $\tan \delta$ |
|---|---|---|
| distilled water | 78 | 0.16 |
| raw beef | 49 | 0.33 |
| mashed potatoes | 65 | 0.34 |
| cooked ham | 45 | 0.56 |
| peas | 63 | 0.25 |
| ceramic[a] | 8–11 | 0.0001–0.001 |
| most plastics | 2–4.5 | 0.001–0.02 |
| some glasses[b] | ca 4.0 ca | 0.001–0.005 |
| papers | 2–3 | 0.05–0.1 |
| woods | 1.2–1.5 | 0.01–0.1 |

[a]Alumina
[b]Pyrex

One skilled in the art of thermal energy storage materials and seeking guidance in the possible use of microwave energy for their heating would find this summary technical information about microwave heating discouraging (unless their thermal energy storage material contained water) and would be disinclined to consider the beneficial use of microwave heating for such materials. Since the thermal energy storage materials used in the present invention do not contain water and are more like plastics in their molecular composition, they would not be expected to efficiently absorb microwave energy. However, we have found, contrary to the teachings of this prior art, that these thermal energy storage materials absorb the 2450 MHz microwave energy almost as efficiently as does water. This fact is demonstrated by Example 1 set forth hereinafter.

Various useful solid-state phase-change materials are listed in the following table along with their respective solid-state transition temperature and energy transition property.

TABLE 2

| | Transition Temperature °C. | Energy Transition cal/g |
|---|---|---|
| 2-methyl-2-amino-1,3-propanediol | 78 | 63 |
| 2-methyl-2-nitro-1,3-propanediol | 78 | 48 |
| 2-hydroxymethyl-1,4-butanediol | 81 | 46 |
| 2,2-bis(aminomethyl)-1,3-propanediol | 68 | 44 |
| 2-methyl-2-hydroxymethyl-1,3-propanediol | 81 | 46 |
| 2-aminomethyl-2-hydroxymethyl-1,3-propanediol | 86 | 46 |
| 2-hydroxymethyl-2-carboxy-1,3-propanediol | 124 | 49 |
| 2-amino-2-hydroxymethyl-1,3-propanediol | 131 | 68 |
| 2-methyl-2-carboxy-1,3-propanediol | 152 | 69 |
| Pentaerythritol | 184 | 72 |
| 2-Amino-2-methyl-1,3-propanediol | 78 | 63 |
| Norbornene anhydride | 73 | 21 |
| Tris(hydroxymethyl)-aminomethane | 86 | 46 |
| Pentaglycerin C(CH$_2$OH)$_3$CH$_3$ | 82 | 46 |
| Neopentyl glycol C(CH$_2$OH)$_2$(CH$_3$)$_2$ | 48 | 31.3 |

Applications for composite phase-change materials are found, for example, in passive solar thermal storage units, such as heat storage walls, also known as Trombe walls. The Trombe wall is a wall located on the interior side of a glazed opening in a building. Generally, the wall is massive and faces south. Sunlight entering through the glazing is absorbed by the wall which stores the energy as heat. The Trombe wall is usually designed so that the absorbed solar heat is conducted through the wall slowly, with a delay of about 8 hours. Stored heat is then released into the interior living space after sunset.

The desired phase-change material(s) are applied in finely divided form to the surface of the porous solid material to be impregnated, after which microwave energy is directed against the materials in a manner such that the phase-change material becomes heated and then melts, whereby the phase-change material can flow into the pores or cavities of the solid material. The phase-change material can be heated above its melting point, if desired. Then after the phase-change material cools it becomes solid and is thereby retained in the pores of the solid material.

Any desired amount of phase-change material can be applied to a porous solid material. If desired, phase-change material can be applied to a solid material more than once and heated by means of microwave energy after each such application. It is also possible to apply the phase-change material in differing amounts to different portions of the surface of the solid material.

A convenient and efficient manner of treating a porous substrate in accordance with this invention is illustrated in FIG. 1. Thus, there is shown conventional apparatus 10 comprising enclosure 12 in which microwave energy is directed at materials passing through the enclosure, chambers 14 are microwave leakage suppression tunnels, and conveyer 13 is for carrying the desired porous materials through the apparatus for exposure to microwave energy.

In addition to impregnating the solid material with the phase-change materials, other types of chemicals may also be impregnated into the porous solid materials. For example, sealing chemicals may be applied to the solid material and heated with microwave energy above their melting points. The purpose of the sealing chemicals is to form a barrier or protective layer at the surface of the porous material. It serves to prevent vapor diffusion of the phase-change material out of the porous material, and it prevents water and other liquids from entering the porous material.

The sealing chemical has a melting point above room temperature. Preferably its melting point is greater than the melting point of the phase-change material. Classes of suitable sealing chemicals include paraffins and thermoplastic polymers known as hot-melt materials. Included are polymers of ethylene/vinyl acetate, atactic polypropylene, polyethylene, and polyolefins. Mixtures of thermoplastic polymers with paraffin wax are also useful.

If desired, the sealing chemical in finely divided form may be mixed with the phase-change material (and also with other desired chemicals) and spread over the surface of the porous material. When microwave energy is applied it will cause the chemicals to become melted, after which they are absorbed into the porous material. When the melting point of the sealing chemical exceeds that of the phase-change material, the sealing chemical does not melt until after the phase-change material has been absorbed into the porous substrate. Thus, the sealing chemical is absorbed at the surface of the porous material and is able to form an effective barrier at the surface.

The sealing chemical preferably is a low-viscosity liquid at or just above the melting point so that it is capable of readily flowing into the pores of the substrate being treated. The resulting coating is coherent and tenacious.

Other types of chemicals may also be impregnated into porous materials. For example, conventional fire-retardant chemicals may be applied to the surface of the porous material and then exposed to microwave energy to melt them.

Conventional fire-retardant chemicals include phosphate esters, halogenated phosphate esters, chlorinated hydrocarbons, brominated hydrocarbons, antimony trioxide, borates, polyols containing phosphorous, brominated bisphenol A, and others known in the art. The type and amount of fire-retardant chemicals used in the impregnation of the porous material may vary, as desired.

It is also possible to include powders of electrically and thermally conductive materials such as carbon, graphite, zinc oxide and tin oxide to improve the absorption of microwave energy. They may also be included for the purpose of increasing the thermal conductivity of the phase-change material to speed the absorption and release of heat into and out of the impregnated porous material for certain applications. It is also possible to include pigments or colorants with the sealing chemical for decorative purposes.

The amount and type of phase-change material used to impregnate the porous material may vary. For example, for tempering the inside air temperature of an air-conditioned building, phase-change materials having transformation temperatures of about 80° F. could be used in ceiling tiles to absorb daytime heat and delay the need for air conditioning to a period when lower cost off-peak electric utility rates apply. A mixture of neopentylglycol and pentaerythritol in an amount of about two pounds per square foot of ceiling tile would be sufficient to delay the need for air conditioning in a typical office by several hours.

Higher temperature (about 100° F.) phase-change materials would be used in a direct solar gain application where the sunlight from a window would heat an adjacent wall containing the phase-change material. The amount of material needed to absorb the available solar heat depends upon the size of the window, its proximity to the wall and, of course, the typical local solar intensity. The amount would be on the order of a few pounds per square foot.

A number of applications are contemplated for using the composite phase-change materials, especially for solar and energy conserving buildings such as:

(a) Cool storage, which is the storage of cooling capacity for building air conditioners. By operating chillers at night to build up cool storage capacity, the building operator can use less expensive electric power at a time when utility provides lower "off peak" rates, rather than during the more expensive daytime "peak" periods.

The chiller can be designed to operate continuously so that both stored capacity and chiller capacity are combined to meet peak cooling needs. Proper design and control strategy can reduce the size and cost of the building's chiller. Maximum electric power requirements at the peak demand of the building can also be reduced. Utility peak demand charges are commonly greater than the charges for actual power consumption; therefore, a reduction in peak demand can be very significant.

In implementing composite phase-change materials for cool storage purposes, the composite phase-change material may be used centrally or distributed. A central cool storage unit would require a composite phase-change material with high thermal conductivity so that heat could be conducted into and out of relatively thick sections of the composite.

Distributed cool storage composites could be employed as relatively thin floor, wall or ceiling coverings, in the form of floor tile, wall board, or ceiling tiles, respectively.

(b) Heat storage is the storage of heating capacity. Nearly 80% of newly constructed homes in the United States are electrically heated. During cold weather, electric utilities experience high power demands because of space heating loads. Higher utility rates are also charged during these periods. By storing heat generated during "off-peak" periods, utility bills can be reduced. This can be accomplished by employing a composite phase-change material in a central location in an electric "storage heater".

(c) Temperature moderation is important in solar heated buildings which have a tendency to overheat during the sunny part of the day, and yet can become uncomfortably cold at night. The mid-temperature solid-state composite phase-change materials can be used to absorb excess heat during the day and release it gradually during the cooler night hours. This can be accomplished by a distributed composite to store and release the excess heat over a large area. One means for accomplishing this can be by using the composite phase-change material as a translucent layer for a Trombe wall or a skylight diffuser so that the same building aperture can conveniently serve both daylighting and solar heating functions.

For temperature moderation, solid-state phase-change material can be impregnated into a wide variety of porous and fibrous materials. Suitable porous materials are those which have an interconnected pore structure and can be wetted by the phase-change material in a liquid state. Specific porous materials can be found in many common materials of construction, such as wood, paper and paper products including fiberboard, cement and concrete as well as their products, gypsum board and related gypsum products, natural clays and porous rock.

Suitable fibrous materials include glass fiber, cotton fiber, plastic fiber, and natural fibers such as cotton, wool, cellulose, and the like.

EXAMPLE 1

Two hundred and ninety-eight grams of a typical phase-change material, neopentylglycol, was fully melted in a beaker using a (nominal) 700 watt, 2450 MHz Litton microwave oven in a period of 9 minutes at full power. The temperature of the melt reached 187 degrees Celsius. The energy required to transform the phase-change material to its high temperature phase, melt it and heat it to 187° C. is approximately 215 kiloJoules. If all of the 700 W of power had been absorbed by the phase-change material over the 9 minute heating period (and none of the energy lost to the glass container), the maximum amount of energy that could have been absorbed would have been about 378 kJ. Thus the heating efficiency was about 215/378=0.57 or 57%.

For comparison, a beaker containing 298 grams of water was heated to 95° C. in the same microwave oven under the same conditions in 3⅓ minutes at full power. The energy required to heat this quantity of water to 95° C. is approximately 87 kJ and the maximum amount of energy delivered by the microwave oven in 3⅓ minutes is 140 kJ. Thus the heating efficiency for water was about 87/140=0.62 or 62%.

This comparison shows that the phase-change material has a surprising ability to absorb microwave energy at 2450 MHz, comparable to the ability of water to absorb microwave energy.

EXAMPLE 2

A six-inch square piece of one-half inch thick commercial, cellulose ceiling tile weighing 75 grams was impregnated with 160 grams of thermal energy storage material plus 30 grams of a paraffin sealant by microwave heating in a domestic microwave oven (2450 MHz, nominal 700 watt power). The resulting composite contained 0.69 grams of thermal energy storage material per square centimeter (1.4 pounds per square foot) of tile surface area.

The thermal energy storage material consisted of a dry powder mixture of neopentylglycol, trimethylol ethane and a paraffin wax (Shellwax 200) in relative weight proportions of 62.5%, 20.8% and 16.7%. The material was added in three steps as a layer of the loose powder mixture on the top surface of the tile inside the microwave oven. The ceiling tile and powder were heated each time for 4 minutes at full power. As the powder melted, it immediately was absorbed into the porous structure of the tile. A total time of twelve minutes of microwave heating was used in this example.

Very little loss of material occurred due to vaporization in contrast to other methods of melting the thermal energy storage material (such as direct heating in a container over an electric heater). Only a slight discoloration of the ceiling tile material occurred indicating that it had not suffered any significant overheating, which is a common problem with other means of impregnating this material.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to falling within the scope of the invention as defined by the claims which follow.

The embodiments of the invention in which an exclusive property or privilege is claimed are defined as follows:

1. A method for impregnating a porous, non-metallic solid material with a phase-change material, the method comprising the steps of:
   (a) providing a phase-change material having a melting point above room temperature; wherein said phase-change material absorbs microwave energy to an extent sufficient to cause melting thereof;
   (b) applying said phase-change material to the surface of said porous material; and
   (c) exposing said phase-change material to microwave energy in a manner such that said phase-change material melts and is absorbed into said porous material.

2. A method in accordance with claim 1, wherein said porous material comprises gypsum wallboard.

3. A method in accordance with claim 1, wherein said porous material comprises a cellulosic substrate.

4. A method in accordance with claim 1, wherein said phase-change material comprises a polyhydric alcohol.

5. A method in accordance with claim 1, wherein said porous material has a porosity of at least 30%.

6. A method in accordance with claim 1, further comprising the steps of providing a sealing chemical, applying said chemical to said surface of said porous material, and exposing said sealing chemical to microwave energy in a manner such that said sealing chemical melts and is absorbed into said porous material.

7. A method in accordance with claim 6, wherein said sealing chemical is selected from the group consisting of paraffin wax, ethylene/vinyl acetate polymers, and polyolefin polymers.

8. A method in accordance with claim 1, wherein said phase-change material is selected from the group consisting of polyhydric alcohols, tris(hydroxymethyl)-aminomethane, and norbornene anhydride.

9. A method in accordance with claim 1, further comprising the steps of providing a solid fire-retardant material, applying said fire-retardant material to said surface of said porous material, and exposing said porous material to microwave energy in a manner such that said fire-retardant material melts and is absorbed into said porous material.

10. A method in accordance with claim 9, wherein said fire-retardant material is selected from the group consisting of phosphate esters, halogenated hydrocarbons, and antimony trioxide.

11. A method in accordance with claim 1, further comprising the steps of providing a sealing chemical having a melting point above the melting point of said phase-change material, mixing said sealing chemical with said phase-change material to form a mixture, and applying said mixture to said surface of said porous material.

12. A method in accordance with claim 11, further comprising the steps of providing a fire-retardant material having a melting point above room temperature and mixing said fire-retardant material with said phase-change material and said sealing chemical.

13. A method for impregnating a porous, non-metallic solid material with a mixture which is effective in maintaining interior building temperatures within prescribed limits, the method comprising the steps of:
  (a) forming a mixture of a phase-change compound with a sealing chemical; wherein said compound has a melting point above room temperature; wherein said compound absorbs microwave energy to an extent sufficient to cause melting thereof; wherein said sealing chemical has a melting point above that of said phase-change compound;
  (b) spreading said mixture onto the surface of said porous material;
  (c) exposing said phase-change compound to microwave energy in a manner such that said phase-change compound melts and is absorbed into said porous material, after which said sealing chemical melts and is absorbed into said porous material.

14. A method in accordance with claim 13, wherein said porous material comprises gypsum wallboard.

15. A method in accordance with claim 13, wherein said porous material comprises a cellulosic substrate.

16. A method in accordance with claim 15, wherein said porous material comprises wood.

17. A method in accordance with claim 13, wherein said phase-change compound comprises a polyhydric alcohol.

18. A method in accordance with claim 13, wherein said powdered sealing chemical is selected from the group consisting of paraffin wax, ethylene/vinylacetate polymers, and polyolefin polymers.

19. A method in accordance with claim 13, wherein said phase-change compound is selected from the group consisting of polyhydric alcohols, tris(hydroxymethyl)-aminomethane, and norbornene anhydride.

20. A method in accordance with claim 13, wherein said phase-change compound comprises at least 50% by weight of said mixture.

21. A method in accordance with claim 13, wherein said porous material has porosity of at least 30%.

22. A method in accordance with claim 13, wherein steps (b) and (c) are repeated at least once using additional quantities of said mixture.

23. A method in accordance with claim 13, wherein said mixture further includes a solid fire-retardant material having a melting point above room temperature.

24. A method in accordance with claim 23, wherein said fire-retardant material is selected from the group consisting of phosphate esters, halogenated hydrocarbons, and antimony trioxide.

25. A method in accordance with claim 13, wherein said porous material comprises concrete.

26. A method in accordance with claim 13, wherein said porous material comprises fibrous material.

27. A method for impregnating a porous, non-metallic solid material with a phase-change material, the method comprising the steps of:
  (a) providing a phase-change material having a melting point above room temperature; wherein said phase-change material absorbs microwave energy to an extent sufficient to cause melting thereof; wherein said phase-change material has a viscosity less than about 100 cps. at its melting point;
  (b) applying said phase-change material to the surface of said porous material; and
  (c) exposing said phase-change material to microwave energy in a manner such that said phase-change material melts and is absorbed into said porous material.

* * * * *